Oct. 16, 1956  A. G. FOLLOWS ET AL  2,767,051
PRODUCTION OF POTASSIUM CARBONATE FROM POTASSIUM
CHLORIDE AND AMMONIATED CARBON DIOXIDE
Filed June 24, 1953  4 Sheets-Sheet 4

INVENTORS.
ALAN G. FOLLOWS
ERNEST B. HOYT
EARL W. SMITH
BY
Alvin Engelstein
ATTORNEY.

United States Patent Office 2,767,051
Patented Oct. 16, 1956

2,767,051

PRODUCTION OF POTASSIUM CARBONATE FROM POTASSIUM CHLORIDE AND AMMONIATED CARBON DIOXIDE

Alan G. Follows, Ernest B. Hoyt, and Earl W. Smith, Syracuse, N. Y., assignors to Allied Chemical & Dye Corporation, New York, N. Y., a corporation of New York Application June 24, 1953, Serial No. 363,841

19 Claims. (Cl. 23—63)

This invention relates to the manufacture of carbonated potash and more particularly refers to a new and improved method of converting potassium chloride into carbonated potash.

As is well known, carbonate of potash can not be produced from the direct reaction between potassium chloride and ammonium bicarbonate solutions because of the unfavorable solubility relationships. For this reason, potassium carbonate has been produced commercially by first producing caustic potash electrolytically followed by carbonation of the product. Caustic potash prepared in diaphragm cells is contaminated with large quantities of potassium chloride making necessary a purification process. Even after carbonation and purification the potassium carbonate contains appreciable amounts of chloride. Also, in the older methods of manufacturing potassium carbonate, the losses of potassium chloride are considerable, amounting to approximately 10%.

The use of an anion active resin has been suggested in Patent 2,543,658, issued February 27, 1951, as a means of converting sodium carbonate and potassium chloride into potassium bicarbonate. Unfortunately, the potassium bicarbonate product of this process is contaminated with the sodium and chloride ions and there is no known commercially practical method of removing these contaminants to produce a pure carbonate of potash. In addition, that anion active resin process is inefficient in operation particularly with respect to requiring dilute solutions of reactants and producing a dilute solution of product necessitating increased cost of evaporation.

One object of the present invention is to provide an efficient method for the preparation of carbonated potash from potassium chloride through the medium of a cation exchange resin.

Another object of this invention is to provide an economical process for producing high yields of exceptionally pure carbonate of potash.

A further object of the present invention is to provide improved methods for purifying the crude carbonated potash product to obtain thereby a purified carbonate of potash.

Further objects and advantages of the invention will be apparent from the following description and accompanying drawings.

In the course of our investigation, we have attempted to produce carbonate of potash from potassium chloride through the medium of an ion exchanger employing sodium carbonate and also ammonium hydroxide as the other reactant. Theoretically, sodium carbonate should react with the resin (R) as follows:

$$2KR + Na_2CO_3 = 2NaR + K_2CO_3$$

Unfortunately, when passing sodium carbonate through the exchanger, approximately 15% to 20% of the sodium carbonate leaked through the exchanger contaminating the potassium carbonate product. This process obviously has no practical utility for the manufacture of carbonated potash since there is no commercial method of separating these two carbonates. When ammonium hydroxide is employed in lieu of sodium carbonate, the product is potassium hydroxide according to the equation:

$$KR + NH_4OH = NH_4R + KOH$$

The potassium hydroxide can then be carbonated to yield potassium carbonate. However, in actual tests, on passing ammonia solutions through the exchanger only a very dilute solution of potassium hydroxide resulted making the process impractical. Thus, the difficulties in producing a workable commercial process for manufacturing pure carbonate of potash by ion exchange will be evident from the foregoing.

In accordance with the present invention, carbonated potash may be prepared by a cyclic process involving the steps of passing an aqueous solution of potassium chloride, preferably a solution at or near the saturation point, through a bed of cation exchange resin, preferably of a sulfonated polystyrene type, in an amount and at a rate sufficient to remove in excess of 95% of the potassium from the solution, thereafter passing wash-water through the bed of cation exchange resin to remove all chloride therefrom, then passing an aqueous carbonated ammonia solution, preferably at or near the saturation point, in large excess required for exchange, preferably more than 200% excess carbonated ammonia, through the cation resin, preferably passing said carbonated ammonia through the bed of cation resin counter to the flow of potassium chloride solution, said carbonated ammonia having a $NH_3/\frac{1}{2}CO_2$ ratio in excess of 0.5, preferably within the range of 0.55 and 0.65, and then passing wash-water through the cation exchange resin to remove carbonate of potash and ammonia therefrom.

The effluent from the bed of cation exchange resin resulting from the passage of carbonated ammonia therethrough is an aqueous solution containing primarily carbonated potash and carbonated ammonia. We have found that the application of heat to the carbonated potash and ammonia product causes volatilization of over 98% of the $NH_3$ initially present in the product, and decomposition of a major portion of $KHCO_3$ to $K_2CO_3$ with evolution of $CO_2$ with attendant removal of a minor portion of water vapor, about 10–20% of the product. The recovered $NH_3$ and $CO_2$ together with added $NH_3$ and $CO_2$ in the proper proportion may be returned for further reaction with the cation exchange resin.

The bottoms from the carbonated potash and ammonia product after volatilization of $NH_3$ and $CO_2$ described above contains some potassium bicarbonate which may then be converted to potassium carbonate by two alternative methods as follows: (a) causticization of the bottoms with potassium hydroxide to give a solution containing only potassium carbonate which solution is evaporated to produce the solid potassium carbonate; and (b) liming the potassium bicarbonate solution by addition of lime to convert the potassium bicarbonate to potassium carbonate, filtering off precipitated calcium carbonate and evaporating the filtrate to produce solid potassium carbonate.

Alternatively, the carbonated potash and ammonia product from the ion exchanger without prior heat treatment may be subjected to submerged combustion to remove free $NH_3$ and $CO_2$ and evaporate sufficient water to precipitate a solid mixture of potassium carbonate and potassium bicarbonate, which when calcined is converted entirely to potassium carbonate.

In the drawings, Figure 1 is a diagrammatic flow sheet illustrating one method of converting potassium chloride and carbonated ammonia to carbonated potash through the medium of a resin exchanger.

Figure 1:
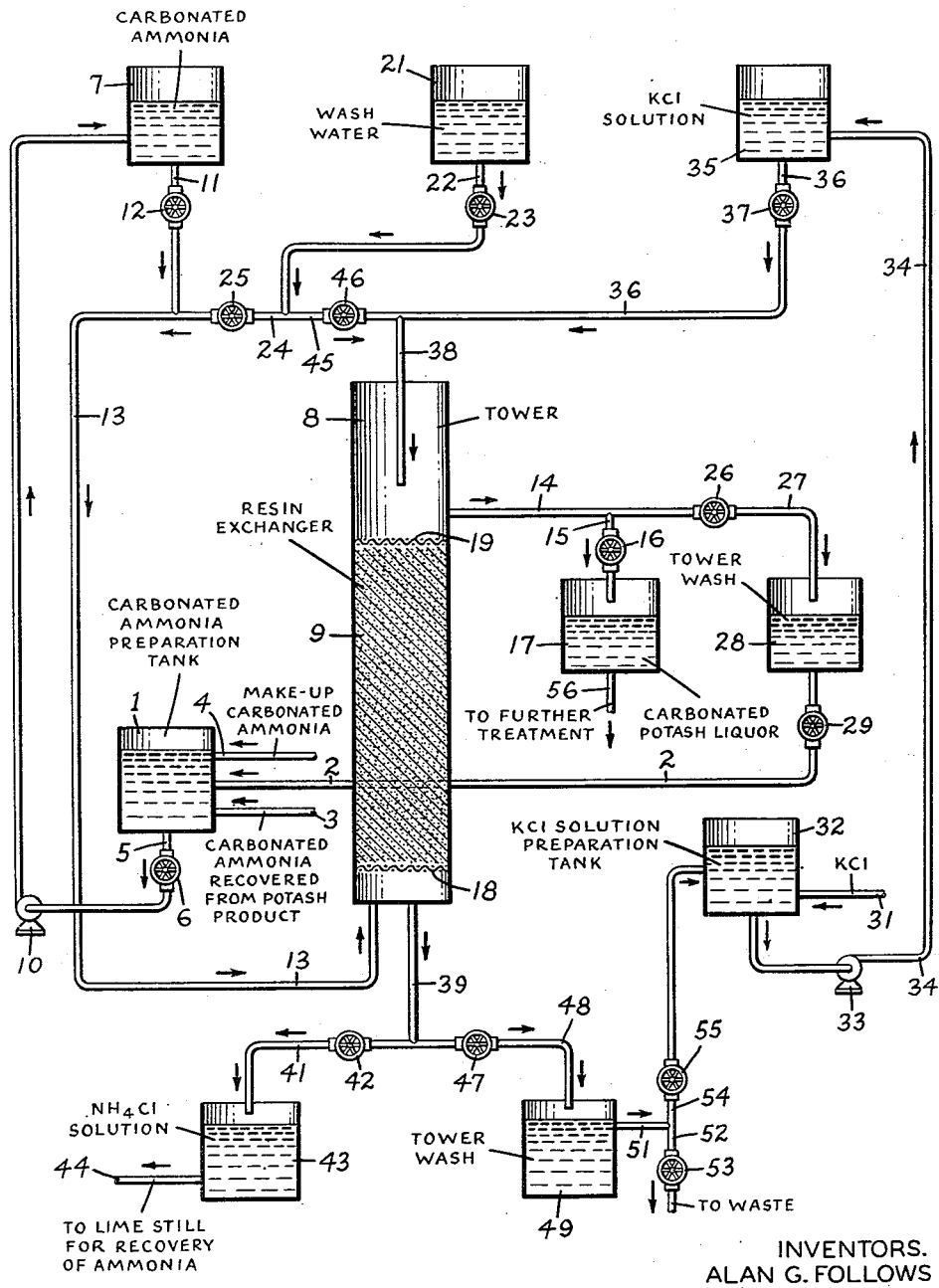

Referring to Figure 1 of the drawing, carbonated ammonia solution for use in the process is prepared in the proper amount and proportion in preparation tank 1. Initially, i. e. the start of the operation, ammonium bicarbonate and ammonium carbonate are dissolved in distilled water in tank 1 to obtain a solution of the required concentrations and ratio of ammonia and carbon dioxide. The carbonated ammonia solution may also be prepared from water, anhydrous NH₃ and CO₂ by absorbing NH₃ in water in a packed tower (absorber) and absorbing CO₂ in the ammonia solution in a second absorber. One of the important factors in the preparation of carbonated ammonia for use in the present process is the ratio of NH₃ to CO₂. On its face, it would appear desirable to maintain as high a ratio of NH₃/CO₂ as possible in order to favor the exchange reaction with the potassium ion of the resin. In the course of numerous experiments, we varied the NH₃/½CO₂ ratio over a wide range and found contrary to normal expectation that increasing the ammonia content beyond the ratio of 0.65 NH₃/½CO₂ gave no improvement in the operation and in fact, was a detriment in that more ammonia would have to be recovered from the carbonated potash product. Merely by way of example, a carbonated ammonia solution containing 55 grams per liter ammonia and 120 grams per liter carbon dioxide gives a yield and concentration of carbonated potash comparable with that produced with carbonated ammonia solutions having much higher ammonia contents. A ratio of NH₃/½CO₂ below 0.5 results in inefficient operation. Another factor of importance in the preparation of the carbonated ammonia solution is the concentration of the solution. The more dilute the solution, the more dilute will be the resultant carbonated potash. Consequently, we prefer to employ a carbonated ammonia solution close to the saturation point of the solution.

The preparation of carbonated ammonia has been described for use in initiating the reaction; however, once the reaction has begun there will be available recovered ammonia and CO₂ from wash-water of the process which may be introduced through line 2 into preparation tank 1 and also carbonated ammonia recovered by evaporation of the potash product, as will be more fully explained later, which enters tank 1 through line 3. Make-up NH₃ and CO₂ in an amount sufficient to bring the total solution up to the desired concentration may be introduced through line 4 in the form of ammonium bicarbonate and ammonium carbonate.

Carbonated ammonia is withdrawn from tank 1 through line 5 and valve 6 and directed by pump 10 into feed tank 7 disposed at an elevation above tower 8 to permit the flow of carbonated ammonia solution by gravity through the bed of resin exchanger 9 in tower 8. The carbonated ammonia solution flows down through line 11, valve 12, line 13 and up through the bed of resin exchanger 9 in tower 8, discharging from the top thereof through lines 14 and 15 and valve 16 and collecting into carbonated potash liquor tank 17. The liquor is then sent through line 56 to further treatment later described. Initially, resin exchanger 9 will be largely but not entirely in the potassium form, i. e. KR, where R represents the complex resin anion portion of the exchanger, assuming a few cycles have been carried out so that a balanced state has been reached. On contact of the carbonated ammonia with the resin there is a cation exchange resulting in the formation of the NH₄R and carbonated potash. Although the affinity of the resin for potassium is greater than for the ammonium ion, nevertheless, an exchange of ions does result with a liquid product composed of a mixture of carbonated potash and carbonated ammonia. In practice, we have found that about 30% of the carbonated ammonia is converted to carbonated potash thereby requiring the passage of a substantial excess of carbonated ammonia through the resin. Stated another way, the amount of carbonated ammonia solution should desirably be at least three times the equivalent amount of solution required for ion exchange with the resin.

Ion exchange may be defined as the process in which one or more ions from a solution changes places with one from a contacting solid, known as the ion exchanger. The ions exchanged may be either cations or anions depending on the exchanger. Ion exchangers owe their reactivity to the presence of polar groups in their structure. There are many types of ion exchange materials available which have different characteristics and applications.

Ion exchangers may be broadly classified into the cation type and anion type. The types of ion exchangers together with their active groups are tabulated below:

| Exchanger type: | Active group |
|---|---|
| (a) Cation types: | |
| 1. Siliceous | R=Al—O⁻ |
| 2. Sulfonated coal | R—SO₃<br>R—COO⁻<br>R—C₆H₅—O⁻ |
| 3. Sulfonated phenolic | R—SO₃⁻<br>R—C₆H₅—O⁻ |
| 4. Sulfonated polystyrene | R—SO₃⁻ |
| 5. Carboxylic | R—COO⁻ |
| (b) Anion types: | |
| 1. Polyamine | R—NH₂<br>R₂—NH<br>R₃—N |
| 2. Quaternary | R₄—N⁺ |

It is seen that some types of exchangers have more than one active group. More important, there is a wide divergence in the capacities in the various types of exchangers. The capacity of an exchanger is one of the important characteristics. Other important properties are: physical stability, chemical stability, physical structure (influences flow rates, washing, etc.) ease of regeneration and cost. The inorganic siliceous exchangers are used in large quantities for softening water on the sodium cycle because of their low cost. However, they have been found unsuitable for use in the present invention because of their very low capacity and poor physical and chemical properties.

The first organic type exchanger manufactured was sulfonated coal, which could be used on the hydrogen as well as the sodium cycle for softening water. This type of exchanger is unsatisfactory for use in the present invention because of low capacity and lack of chemical stability.

The sulfonated phenolics were the first sulfonated synthetic resin exchangers to be devolped. Although they operate reasonably well in the present invention, compared to the polystyrene resins they have lower capacity and poorer physical and chemical stabilities.

The sulfonated polystyrene resins are made from polystyrene and divinyl benzene to give a cross-linked resin. They are orange brown spherical particles having a size distribution of about 16 to 50 mesh. These resins have a very high capacity, good physical stability, are suitable for a wide pH range and at high temperatures, have good stability toward oxidizing agents and can be readily washed. These resins excel for use in the present invention and are our preferred cation exchange resins. Sulfonated polystyrene resins are commercially manufactured under the trade names "Amberlite IR-120," "Nalcite HCR," and "Permutit Q."

The carboxylic acid type resin is based on a cross-linked acrylic vinyl polymer. The carboxylic type resins, while they do not have the desired properties of the sulfonated polystyrene resins for use in the present invention, will operate reasonably well. The disadvantage of the carboxylic acid type resins is that they do not split the salts of strong acids to the same extent as the sulfonated polystyrene resins. Furthermore, the exchange capacity of the carboxylic acid resins is affected considerably by the pH of the solution.

Anion exchangers are usually used in the free base or hydroxyl form to remove acid produced by cation exchangers. In this way, water can be demineralized. The polyamine type can absorb only stronger acids and allows the weaker ones such as carbonic and silicic to pass through. The strongly basic quaternary type will absorb the weaker acids as well and thus can completely demineralize water. These resins are also capable of splitting neutral salts. The resin can be regenerated to the free base form with another strong base such as sodium hydroxide, but not with ammonia or sodium carbonate. In tests with anion exchange resins employing potassium chloride as the reactant, it was found that considerable potassium chloride leaked through the exchanger resulting in contamination of the potash product. Regeneration of the resin was also a problem. Furthermore, the anion exchangers lacked the capacities of the cation exchangers. From the foregoing, it will be apparent that anion exchangers were found to be unsatisfactory for use in the present invention.

Based on extensive experimentation as indicated above, the exchange resins which have practical utility in the process of the present invention, are organic cation exchangers of the sulfonated phenolic, carboxylic acid and sulfonated polystyrene types. The cation exchanger of the sulfonated polystyrene type is our preferred exchange resin.

Tower 8, in which the resin is disposed, may be a cylindrical vertical vessel with a perforated member or bottom screen 18 supporting resin 9 and a perforated member 19 at the top of the bed of resin to retain it in position. The ion exchange operation may be conveniently carried out under substantially atmospheric temperature and pressure. High reaction temperatures have the advantage of increasing the speed of reaction but increase the cost of operation. While higher temperatures are advantageous when passing KCl solution through the resin, temperatures above about 35° C. are undesirable when passing carbonated ammonia solution through the resin due to decreased solubility of the carbonated ammonia. Superatmospheric pressures are beneficial but increase the cost of operation. Roughly, approximately 1 liter of resin exchanger is employed per liter of saturated carbonated ammonia solution passed through the exchanger in each cycle. A convenient method of flowing the reactants through the bed of resin exchanger is by gravity as illustrated in Figure 1. Ordinarily, a complete cycle of operation will require about 20–30 minutes of which time about 10–15 minutes is needed to pass the carbonated ammonia solution through a resin exchanger and about 5–10 minutes for the passage of potassium chloride solution.

Referring again to Figure 1, thus far we have traced the flow of carbonated ammonia through tower 8. Some of the carbonated ammonia is retained in the bed of resin. If potassium chloride solution was then immediately passed through the resin exchanger, considerable potassium chloride would leak through the tower. Accordingly, wash-water in an amount sufficient to eliminate carbonate from the tower (in practice an amount of water equal to about 60–70% of the volume of the carbonated ammonia solution was generally found adequate) is passed through the tower. Wash-water flows from tank 21 down through line 22, valve 23, line 24, valve 25 and line 13 into the bottom of tower 8, up through the bed of resin exchanger 9, discharging through line 14, valve 26, and line 27 into tower wash collecting tank 28. Since the tower wash-water contains $NH_3$ and $CO_2$, it may be returned through line 2 and valve 29 into preparation tank 1 to be returned for further reaction with the exchange resin.

The next step in the cycle is the reaction of potassium chloride with the resin exchanger to substitute a potassium ion for the $NH_4$ ion attached to the resin. Potassium chloride solution may be prepared by simply introducing KCl through line 31 to dissolve in water contained in preparation tank 32. As a precautionary measure, the KCl solution in tank 32 may be filtered or purified to remove suspended matter before running it into resin 9. For the reasons previously given, it is desirable to have a solution close to the saturation point which is approximately about 300 grams KCl per liter. Potassium chloride is a relatively valuable product and it is, therefore, important that little or no potassium chloride leak through the exchanger because potassium chloride cannot easily be recovered from solutions containing it and ammonium chloride. Thus an excess of potassium chloride solution should not be used. The proper point to terminate flow of potassium chloride solution through the resin exchanger tower may readily be determined by analyzing the effluent to determine at what point potassium chloride leaks through the tower. As a practical matter, it is desirable to maintain the losses of the valuable potassium chloride to about 3% or less. We have found that the passage through the bed of resin exchanger of more than 90–100 grams KCl per liter resin results in excessive losses of KCl. Passage of less than about 50 grams KCl per liter resin through the bed of resin impairs the efficiency of operation. Our preferred range is 65–85 grams of KCl per liter resin. In actual practice when operating on a balanced cycle one liter of the resin exchanger was found to react with about 75 grams of KCl with a recovery of over 98% of the potassium. The potassium chloride solution from tank 32 is forced by pump 33 through line 34 into KCl solution feed tank 35 and then flows by gravity downwardly through line 36, valve 37 and line 38 into the top of tower 8, thence down through resin exchanger 9 wherein it reacts to form ammonium chloride, discharging from the bottom of the tower through lines 39 and 41 and valve 42 and collecting in ammonium chloride solution tank 43. The ammonium chloride solution may be directed through line 44 to conventional lime still for recovery of $NH_3$ which can be reused in the process.

As will be noted, the flows of the carbonated ammonia solution and the potassium chloride solution through the resin exchanger are in countercurrent directions. Test data for comparison of countercurrent and unidirectional flows of the two solutions through the resin exchanger showed that for the unidirectional flow, the yield and concentration of carbonated potash product was appreciably lower, approximately 23% less, and that the conversion of potassium chloride dropped about 12%.

Some of the chloride is retained in the bed of resin after passage of potassium chloride solution through the resin exchanger. To eliminate chloride from tower 8, wash-water is passed from tank 21 down through line 22, valve 23, line 45, valve 46 and line 38, thence through resin exchanger 9, discharging from the bottom of tower 8 through line 39, valve 47 and line 48 into tower wash tank 49. Ordinarily, an amount of wash-water equal to 3–4 volumes of potassium chloride solution will be adequate to remove all the chloride from tower 8. The tower wash-water contains only slight amounts of potassium chloride and may be discharged from tank 49 through lines 51 and 52 and valve 53 to waste or, if desired, part of the tower wash-water may be returned through line 54 and valve 55 into preparation tank 32.

Figure 2:
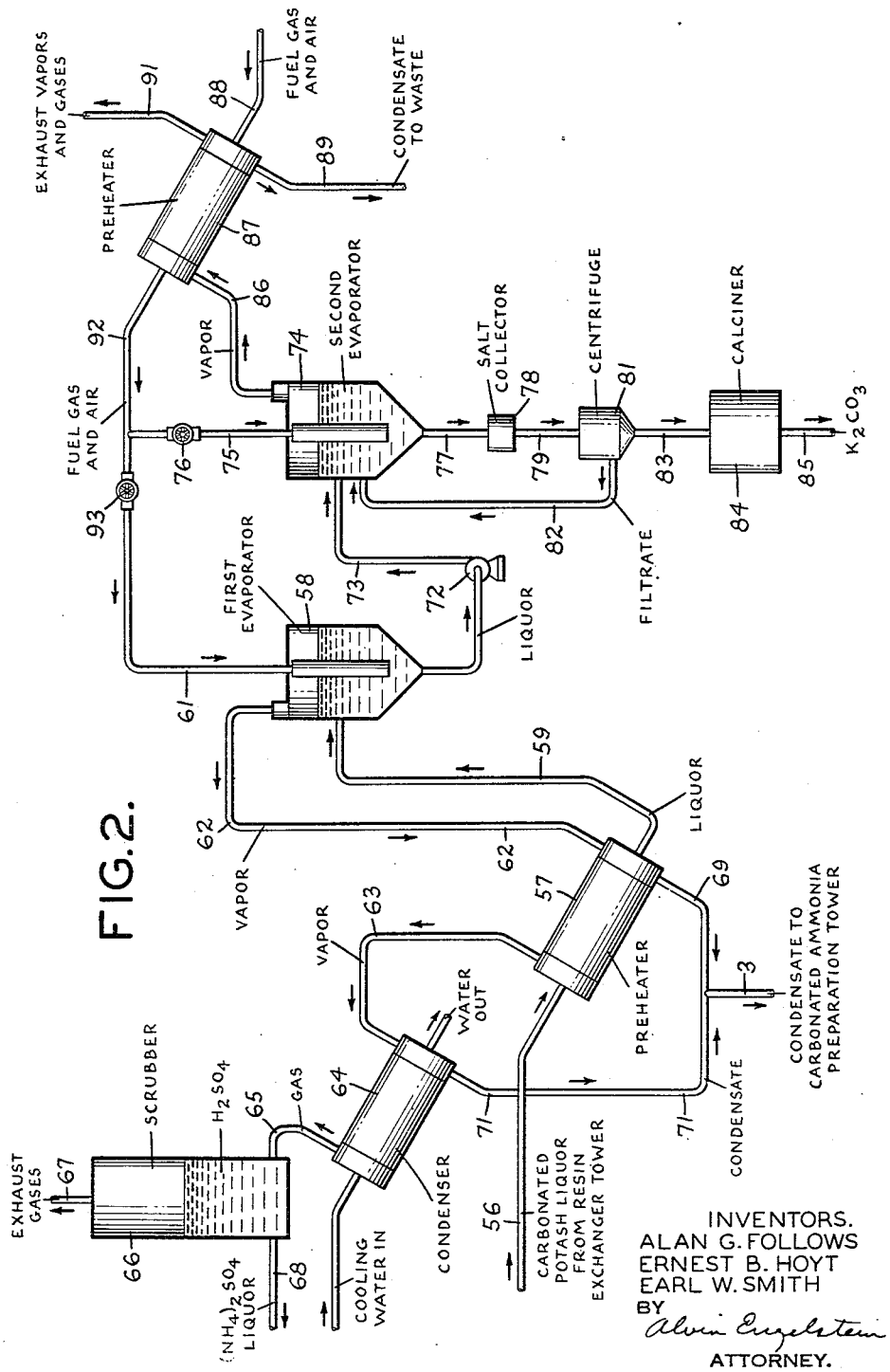
Figure 2 is a diagrammatic flow sheet for effecting submerged combustion of the carbonated potash product from the resin exchanger to remove free NH₃ and CO₂, and evaporate the water to precipitate a solid carbonate of potash.
Figure 3:
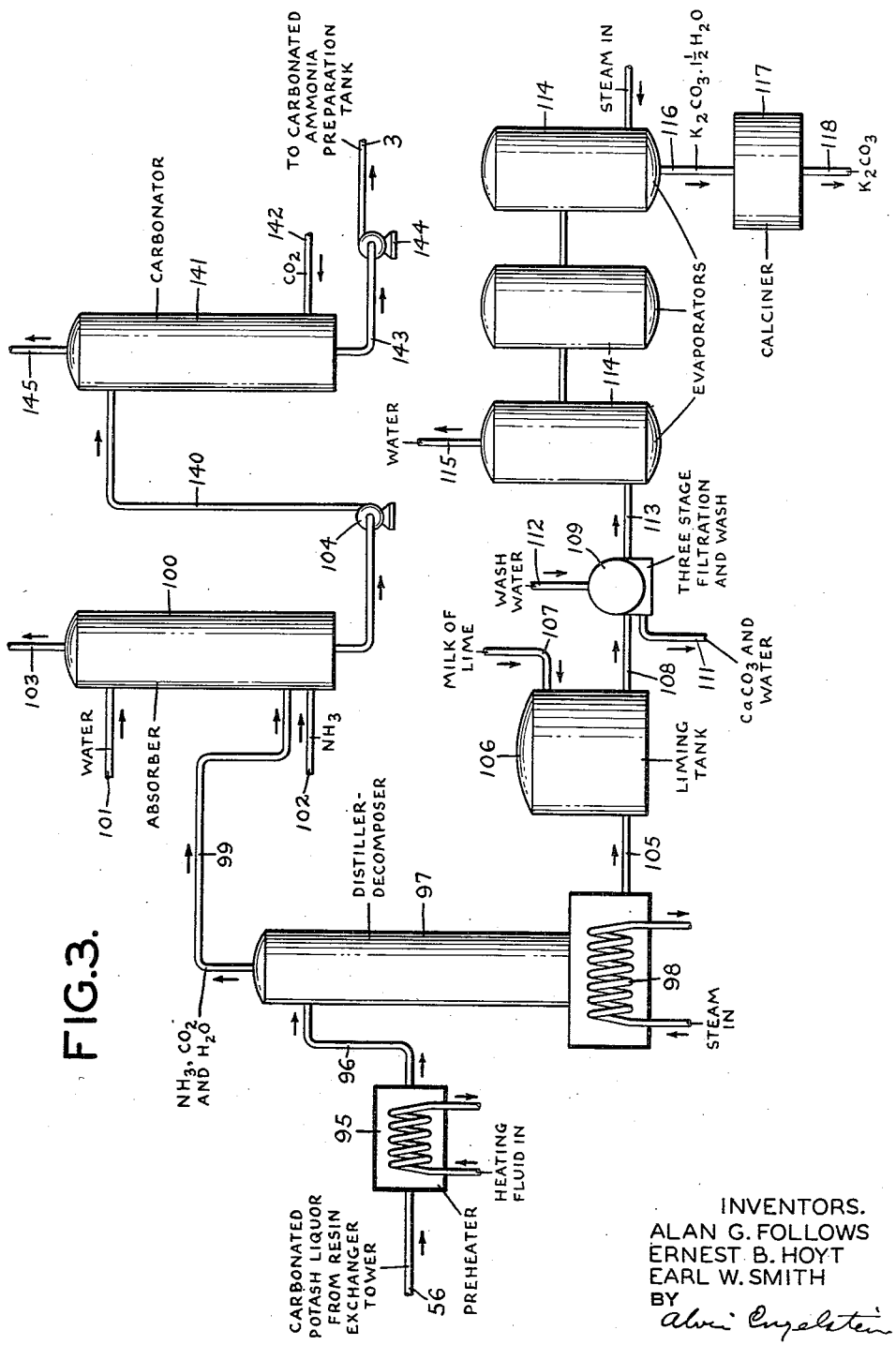
Figure 3 is a diagrammatic flow sheet illustrating one method of treating the carbonated potash product from the resin exchanger to recover NH₃ and CO₂, and liming the carbonated potash to produce potassium carbonate.
Figure 4:
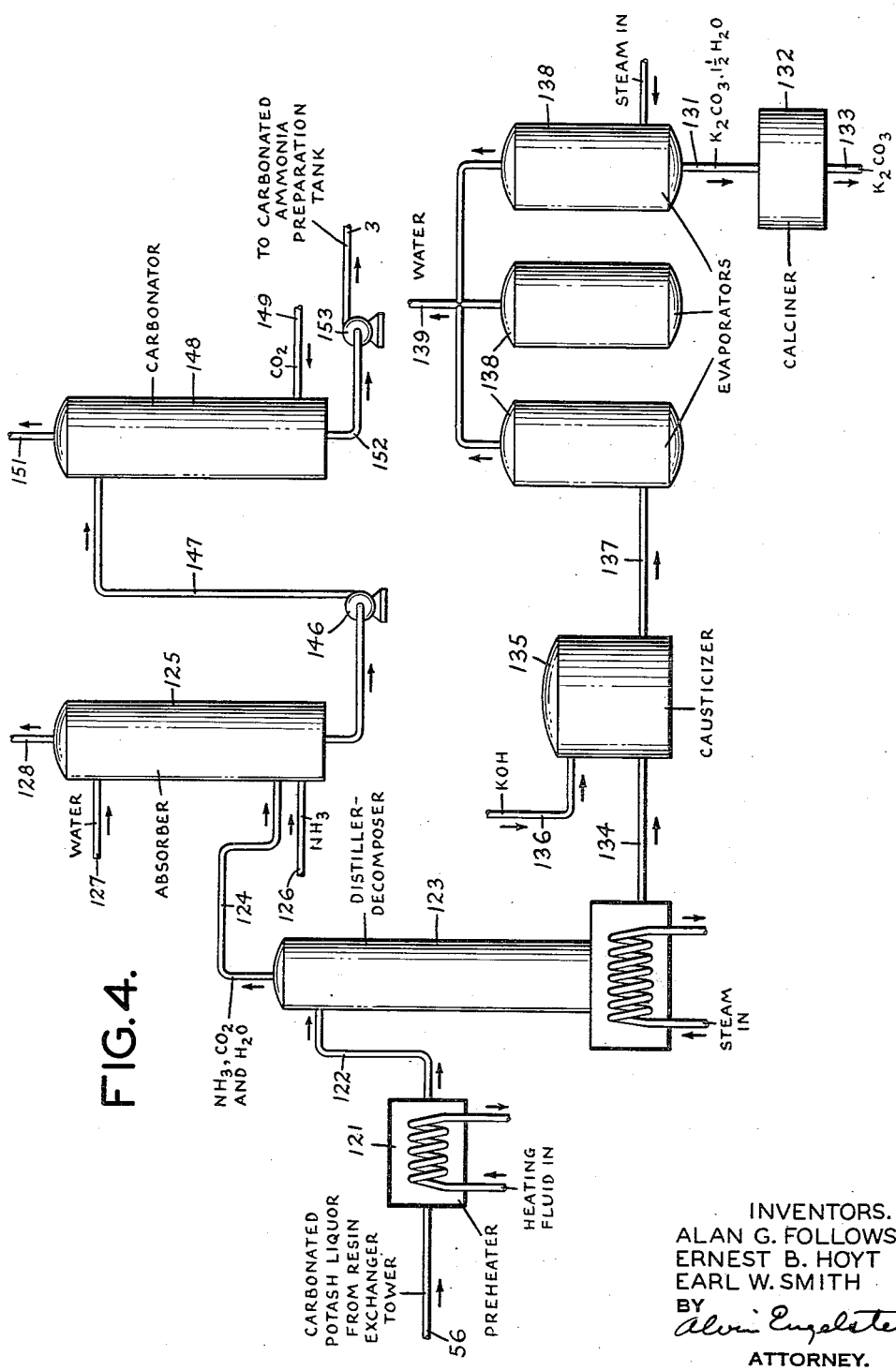
Figure 4 is a diagrammatic flow sheet illustrating one method of treating the carbonated potash from the resin exchanger to recover NH₃ and CO₂, and causticizing the carbonated potash with potassium hydroxide to produce potassium carbonate.

The tower product solution in collecting tank 17 consists essentially of water, carbonate of potash, $NH_3$ and $CO_2$. A typical example of the concentrations of the solution components are approximately 100 g. p. l. $KHCO_3$, 28 g. p. l. $NH_3$ and 55 g. p. l. $CO_2$. To obtain a pure carbonate of potash it is necessary to remove the $NH_3$ and free $CO_2$ from the tower product solution. Also it is important because of the value of $NH_3$ to recover the $NH_3$ in a form suitable for reuse in the process. The commercial product frequently desired is solid $K_2CO_3$. Since the carbonated potash product from the resin exchanger is primarily in the form of $KHCO_3$, water must be evaporated and $KHCO_3$ converted to $K_2CO_3$. Thus, the overall operations for further treatment of the tower product solution are desorption of the $NH_3$ and free $CO_2$, the conversion of $KHCO_3$ to $K_2CO_3$, the evaporation of water and the ultimate production, if desired, of dense calcined carbonate of potash. In Figures 2, 3 and 4 are illustrated three distinct methods of accomplishing the overall operations.

Referring to Figure 2, illustrating the submerged combustion method, feed liquor withdrawn from tank 17 through line 56 (Fig. 1) is preheated from about 25° C. to about 90° C. in preheater 57 by the condensation of a portion of the vapors from the first evaporator. The preheated liquor enters first evaporator 58 through line 59 wherein it is distilled by submerged combustion of preheated gas and air introduced through line 61 below the liquid level in evaporator 58. Approximately 40% of the volume charged to evaporator 58 is removed as vapors. We have found that when the feed liquor has been evaporated to 60% of its initial volume, the bottoms contain less than 2% of the $NH_3$ initially present; or stated conversely, when 40% volume of the charge has been distilled, 98+% of the $NH_3$ will have been desorbed. The recovery of $NH_3$ for reuse in the process of Figure 1 is economically important because of the cost of $NH_3$. In addition, the volume of recovered ammonia liquor, which can be employed as influent to the preparation tank 1, is limited because of recycling of tower wash in tank 28 to tank 1 (Fig. 1). In practice we have found efficient operation would be accomplished by evaporating 40% to 50% of the feed liquor in evaporator 58 and returning the resultant distillate containing $NH_3$ and $CO_2$ to tank 1 of Figure 1.

Vapors and carbonation products are released from the top of evaporator 58 through line 62 and then pass in indirect heat exchange in preheater 57 with feed liquor flowing through line 56 thereby effecting partial condensation of the vapors. The uncondensed vapors leaving preheater 57 through line 63 enter condenser 64 wherein they are cooled and condensed by indirect heat exchange with cooling water. Uncondensed gas containing a small amount of $NH_3$ may be discharged to the atmosphere or more desirably may be introduced through line 65 into conventional scrubber 66 containing sulfuric acid to produce ammonium sulfate. Scrubbed exhaust gases are discharged from the top of scrubber 66 through line 67. Ammonium sulfate liquor may be withdrawn from scrubber 66 through line 68 and directed for further treatment for recovery of ammonium sulfate. Condensate from preheater 57 discharging through line 69 and from condenser 64 discharging from line 71 may be combined and directed through line 3 to tank 1 of Figure 1.

Liquor from the evaporator 58 is then charged by pump 72 through line 73 into second evaporator 74 similar in construction to evaporator 58. Evaporation is completed and carbonate of potash salted out in the second evaporator by means of submerged combustion of preheated gas and air entering through line 75 and valve 76. Wet carbonate of potash is withdrawn from the second evaporator through line 77 to salt collecting vessel 78 and then sent through line 79 to centrifuge 81. Filtrate from centrifuge 81 may be returned through line 82 to evaporator 74 for further evaporation. Carbonate of potash may then be directed through line 83 to conventional calciner 84 to produce $K_2CO_3$ discharging through line 85. If a dense carbonate of potash is desired, the $K_2CO_3$ may be hydrated to $K_2CO_3.\tfrac{1}{2}H_2O$ and recalcined to produce dense $K_2CO_3$. Vapors from evaporator 74 are released through line 86 passing through preheater 87 wherein they heat incoming fuel gas and air entering through line 88. The condensate is discharged to waste through line 89 and uncondensed vapors and gases are discharged from the system through line 91. Preheated fuel gas and air flows through line 92, valve 93 and line 61 into first evaporator 58 and into second evaporator 74 via line 75 and valve 76.

Although the submerged combustion operation of Figure 2 has been described as a two-stage method of evaporation, it will be evident that evaporation can be carried out in only one evaporator.

The operation of submerged combustion as described in Figure 2 has the advantages of simultaneously desorbing, distilling and salting out the tower product solution while maintaining its high purity. It will be particularly noted that in this operation, no reactant is added to the carbonated potash liquor from resin exchange tower thereby avoiding any possible contamination of the product. In addition, the construction and operation of the apparatus is economical and simple. Tile or acid brick-lined evaporators may be employed thereby eliminating any difficulty with corrosion. High heat efficiencies are obtained by the direct contact of the combustion gases with the liquor. Radiation losses are very low. Also, because of the partial pressure effect of the combustion gases introduced in direct contact with the liquor, evaporation is facilitated.

In the liming method of treating carbonated potash liquor, illustrated in Fig. 3, the tower feed is passed through line 56 into preheater 95 wherein it is heated by means of indirect heat exchange with any suitable heating fluid such as steam and the preheated feed then transferred through line 96 to a point near the top of distiller-decomposer 97 which may be any suitable tower containing bubblecap plates, pans or packing, equipped with the usual reboiler section and steam coil 98 for supplying heat for distillation. Two actions occur in distiller-decomposer 97—desorption of $NH_3$ and free $CO_2$ and conversion of a major proportion of the $KHCO_3$ in the feed (as high as 85–90%) to $K_2CO_3$. Distillation and decomposition may be carried out at about substantially atmospheric pressure and a temperature of 80–100° C. Higher pressures and temperatures may be employed but are unnecessary. The gases and vapors released from the top of tower 97 through line 99 contain over 98% of the $NH_3$, together with water vapor equivalent to about 10% of the water in the feed. The bottoms contain less than 2% of the $NH_3$ initially present. The $NH_3$ and $CO_2$ gases and the water vapor from the top of tower 97 are led via line 99 into the bottom of absorber 100, a packed tower, wherein they are absorbed by a downwardly stream of water entering near the top of tower 100 through line 101. Desirably the weak carbonated wash water in tank 28 (Fig. 1) is employed as all or part of the scrubbing water entering tower 100 through line 101. Additional ammonia needed for the preparation of carbonated ammonia for use in the ion exchange tower may be introduced through line 102. Uncondensed gases are discharged from the top of tower 100 through vent 103. The resulting solution from the bottom of absorber 100 is directed by pump 104 through line 140 into the top of carbonator 141, also a packed tower, wherein it flows downwardly absorbing $CO_2$ entering through line 142 to produce a carbonated ammonia solution for use in the ion exchange tower. Uncondensed gases are vented from the top of tower 141 through line 145. The carbonated ammonia solution withdrawn from the bottom of carbonator 141 through line 143 is sent by pump 144 via line 3 to tank 1 of Figure 1 for further use in the process.

The bottoms in tower 97 constituting about 90% of the feed charge are sent through line 105 to liming tank 106 desirably equipped with an agitator. Into tank 106 is introuced milk of lime through line 107 in an amount sufficient to convert potassium bicarbonate to potassium carbonate as indicated by the following equation:

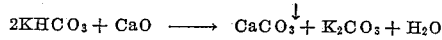

The resulting products in liming tank 106 are principally a mixture of $K_2CO_3$ solution and muds. This mixture is directed through line 108 to conventional 3-stage filtration and wash 109 to effect separation of the salts consisting principally of calcium carbonate which discharges through line 111. Wash-water for washing the muds is shown as entering through line 112.

The filtrate is then directed via line 113 to conventional 3-stage evaporators 114 for removal of water shown discharging through vapor line 115 and production of hydrated potassium carbonate leaving through line 116. If it is desired to produce a dense calcined carbonate of potash, the $K_2CO_3 \cdot \frac{1}{2}H_2O$ from evaporators 114 is calcined in a conventional manner in calciner 117. The resultant product discharging through line 118 is dense $K_2CO_3$.

Although the potassium carbonate produced by liming as described above is satisfactory, it is not as pure as the potassium carbonate product produced by the method of submerged combustion because commercial lime contains impurities which are carried over to a small extent into the final $K_2CO_3$ product.

In Figure 4 is illustrated the method of desorbing and converting carbonated potash liquor to potassium carbonate by causticization. Potash liquor entering line 56 is heated in preheater 121 and then passed via line 122 to distiller-decomposer 123 wherein the major portion of the $KHCO_3$ decomposes to $K_2CO_3$ and desorption of $NH_3$ and $CO_2$ occurs. $NH_3$ and $CO_2$ gases and water vapor flow through line 124 into absorber 125 passing upwardly together with added $NH_3$ entering through line 126 countercurrent to water entering tower 125 through line 127. Uncondensed gases are released from the top of tower 125 through line 128. The solution from the bottom of absorber 125 is forced by pump 146 through line 147 into the top of carbonator where it flows downwardly countercurrent to $CO_2$ entering through line 149. Uncondensed gases are released through vent 151. Carbonated ammonia solution withdrawn through line 152 is directed by pump 153 via line 3 to tank 1 of Figure 1 for further use in the process. Thus far the operation is similar to that described in Figure 3.

Bottoms from distiller-decomposer 123 then flow through line 134 to causticizer tank 135 into which is introduced KOH through line 136 in an amount sufficient to react with the $KHCO_3$ in the bottoms to produce $K_2CO_3$. The potassium carbonate solution from tank 135 is then directed through line 137 to conventional triple-effect evaporators 138 to effect removal of water shown released through line 139 and the production of $K_2CO_3 \cdot \frac{1}{2}H_2O$ discharged through line 131. The potassium carbonate hydrate may then be calcined in calciner 132 in a conventional manner, to produce a dense carbonate of potash leaving line 133.

The causticization method has been found eminently satisfactory for desorbing and converting carbonated potash to $K_2CO_3$. Since the quantity of KOH required for causticization is relatively small, the resultant $K_2CO_3$ is purer than that produced by the conventional method of carbonation of KOH.

The following example illustrates the present invention.

A carbonated ammonia solution having a concentration of 54 g. p. l. $NH_3$ and 120 g. p. l. $CO_2$ is passed upwardly through a bed of potassium sulfonated polystyrene exchange resin ("Amberlite IR-120") which had previously been washed with water in an amount of 1 liter of carbonated ammonia solution per liter of exchange resin. The effluent from the top of the bed of resin exchanger first constitutes displaced water in the bed of exchange resin in an amount equal to about 40% by volume of the carbonated ammonia solution. This displaced water is discarded. The next 60% solution based on the volume of carbonated ammonia solution leaving the top of resin bed is carbonated potash solution which is collected in a tank. Wash-water in an amount equal to 70% of the volume of carbonated ammonia solution is then passed upwardly through the bed of resin exchanger. The first 30% solution based on the volume of carbonated ammonia solution from the top of the bed is rich in carbonated potash and is combined with the previous 60% solution in the tank. The combined carbonated potash solution contains 70 g. p. l. carbonated potash calculated as $K_2CO_3$ and 26 g. p. l. $NH_3$. The next 40% solution from the top of the resin bed is effluent wash-water containing 13.5 g. p. l. carbonated potash calculated as $K_2CO_3$ and 26 g. p. l. $NH_3$. This wash-water is separately collected for reuse in the process. The time for passing both the carbonated ammonia solution and wash-water through the resin bed is 15 minutes.

An aqueous solution of potassium chloride having a concentration of 300 g. p. l. KCl in an amount equal to 25% of the volume of the carbonated ammonia solution is passed downwardly through the bed of resin exchanger. This is followed by passing wash-water in an amount equal to 95% of the volume of carbonated ammonia solution down through the bed of resin. The time for passing the KCl solution and wash water through the resin bed is about 10 minutes. The first 30% solution from the bottom of the resin tower, based on the volume of carbonated ammonia solution, is displaced water which is discarded. The next 70% effluent solution from the bottom of the resin tower contains 72 g. p. l. $NH_4Cl$ and 1–2 g. p. l. KCl and is separately collected for recovery of the $NH_3$. The next 20% effluent solution from the bottom of the resin tower contains about 0.2 g. p. l. $NH_4Cl$ and a trace of KCl and may be discarded or directed to KCl preparation tank for use in the process.

The above complete cycle of operation is carried out at substantially atmospheric pressure and temperature.

The carbonated potash product from the resin exchanger is then placed in a vessel and evaporated by means of submerged combustion resulting from the burning of fuel gas and air below the liquid level of the liquor until 42% of the carbonated potash liquor is vaporized as water. Over 98% of the $NH_3$ in the liquor together with free $CO_2$ in the liquor is carried over with the water vapor. This vapor is condensed and the condensate containing dissolved $NH_3$ and $CO_2$ returned for further reaction with the resin.

Submerged combustion of the remaining 60% bottoms is continued until there is produced a solid carbonate of potash consisting of a mixture of $K_2CO_3$ and $KHCO_3$ substantially free of impurities. The solid carbonate of potash is then calcined by heating to a temperature of 150° C. until the entire product is converted to $K_2CO_3$. The yield of $K_2CO_3$ based on the KCl charged into the system is over 95%.

The term "Concentrated solution" as used in the herein appended claims shall mean "a saturated solution and a solution near the saturation point."

Although certain preferred embodiments of the invention have been disclosed for purpose of illustration it will be evident that various changes and modifications may be made therein without departing from the scope and spirit of the invention.

We claim:

1. A process for the manufacture of carbonated potash from potassium chloride and carbonated ammonia which comprises passing an aqueous solution of potassium chloride through a bed of an organic cation exchange resin selected from the group consisting of a sulfonated phenolic, carboxylic acid and sulfonated polystyrene resins in an amount of less than 100 grams KCl per liter resin, thereafter passing water through the bed of cation exchange resin for washing said bed of resin to remove substantially all chloride therefrom, then passing through the cation resin an aqueous carbonated ammonia solution having a $NH_3/\frac{1}{2}CO_2$ molar ratio in excess of 0.5 in an amount in excess required for exchange with the resin followed by passing water through the cation exchange resin, recovering as effluent from the resin bed an aqueous solution of carbonated potash and carbonated ammonia and heating said aqueous solution of carbonated potash and carbonated ammonia to vaporize $NH_3$ and $CO_2$.

2. A process for the manufacture of carbonated potash from potassium chloride and carbonated ammonia which comprises passing a concentrated aqueous solution of potassium chloride through a bed of an organic cation exchange resin selected from the group consisting of a sulfonated phenolic, carboxylic acid and sulfonated polystyrene resins in an amount of 65-85 grams KCl per liter resin, thereafter passing water through the bed of cation exchange resin for washing said bed of resin to remove substantially all chloride therefrom, then passing through the cation resin a concentrated aqueous carbonated ammonia solution having a $NH_3/\frac{1}{2}CO_2$ molar ratio within the range of 0.55 and 0.65 in an amount in excess required for exchange with the resin followed by passing water through the cation exchange resin, recovering as effluent from the resin bed an aqueous solution of carbonated potash and carbonated ammonia and heating said aqueous solution of carbonated potash and carbonated ammonia to vaporize $NH_3$ and $CO_2$.

3. A process for the manufacture of carbonated potash from potassium chloride and carbonated ammonia which comprises passing an aqueous solution of potassium chloride through a bed of an organic cation exchange resin selected from the group consisting of a sulfonated phenolic, carboxylic acid and sulfonated polystyrene resins in an amount of 65-85 grams KCl per liter resin, thereafter passing water through the bed of cation exchange resin for washing said bed of resin to remove substantially all chloride therefrom, then passing through the cation resin an aqueous carbonated ammonia solution having a $NH_3/\frac{1}{2}CO_2$ molar ratio in excess of 0.5 in an amount in excess required for exchange with the resin followed by passing water through the cation exchange resin, recovering as effluent from the resin bed an aqueous solution of carbonated potash and carbonated ammonia, heating said aqueous solution of carbonated potash and carbonated ammonia to convert a major portion of the $KHCO_3$ in the solution to $K_2CO_3$ and to vaporize over 98% $NH_3$ initially present in said solution together with free $CO_2$ and a small amount of water vapor, and recycling the thus liberated $NH_3$ and $CO_2$ for further reaction with the resin.

4. A process for the manufacture of carbonated potash from potassium chloride and carbonated ammonia which comprises passing an aqueous solution of potassium chloride through a bed of sulfonated polystyrene cation exchange resin in an amount of less than 100 grams KCl per liter resin, thereafter passing water through the bed of cation exchange resin for washing said bed of resin to remove substantially all chloride therefrom, then passing through the cation resin an aqueous carbonated ammonia solution having a $NH_3/\frac{1}{2}CO_2$ molar ratio in excess of 0.5 in an amount in excess required for exchange with the resin followed by passing water through the cation exchange resin, recovering as effluent from the resin bed an aqueous solution of carbonated potash and carbonated ammonia and heating said aqueous solution of carbonated potash and carbonated ammonia to vaporize $NH_3$ and $CO_2$.

5. A process for the manufacture of carbonated potash from potassium chloride and carbonated ammonia which comprises passing a concentrated aqueous solution of potassium chloride through a bed of sulfonated polystyrene cation exchange resin in approximately an amount of 65-85 grams KCl per liter resin, thereafter passing water through the bed of cation exchange resin for washing of said bed of resin to remove substantially all chloride therefrom, then passing through the cation resin a concentrated aqueous carbonated ammonia solution having a $NH_3/\frac{1}{2}CO_2$ molar ratio within the range of 0.55 and 0.65 in an amount in large excess required for exchange with the resin followed by passing water through the cation exchange resin, recovering as effluent from the resin bed an aqueous solution of carbonated potash and carbonated ammonia and heating said aqueous solution of carbonated potash and carbonated ammonia to vaporize $NH_3$ and $CO_2$.

6. A process for the manufacture of carbonated potash from potassium chloride and carbonated ammonia which comprises passing an aqueous solution of potassium chloride through a bed of sulfonated polystyrene cation exchange resin in an amount of 65-85 grams KCl per liter resin, thereafter passing water through the bed of cation exchange resin for washing said bed of resin to remove substantially all chloride therefrom, then passing through the cation resin an aqueous carbonated ammonia solution having a $NH_3/\frac{1}{2}CO_2$ molar ratio in excess of 0.5 in an amount in excess required for exchange with the resin followed by passing water through the cation exchange resin, recovering as effluent from the resin bed an aqueous solution of carbonated potash and carbonated ammonia, heating said aqueous solution of carbonated potash and carbonated ammonia to convert a major portion of the $KHCO_3$ in the solution to $K_2CO_3$ and to vaporize over 98% $NH_3$ initially present in said solution together with free $CO_2$ and a small amount of water vapor, and recycling the thus liberated $NH_3$ and $CO_2$ for further reaction with the resin.

7. A process for the manufacture of carbonated potash from potassium chloride and carbonated ammonia which comprises passing an aqueous solution of potassium chloride through a bed of sulfonated phenolic cation exchange resin in an amount of less than 100 grams KCl per liter resin, thereafter passing water through the bed of cation exchange resin for washing said bed of resin to remove substantially all chloride therefrom, then passing through the cation resin an aqueous carbonated ammonia solution having a $NH_3/\frac{1}{2}CO_2$ molar ratio in excess of 0.5 in an amount in excess required for exchange with the resin followed by passing water through the cation exchange resin, recovering as effluent from the resin bed an aqueous solution of carbonated potash and carbonated ammonia and heating said aqueous solution of carbonated potash and carbonated ammonia to vaporize $NH_3$ and $CO_2$.

8. A process for the manufacture of carbonated potash from potassium chloride and carbonated ammonia which comprises passing a concentrated aqueous solution of potassium chloride through a bed of sulfonated phenolic cation exchange resin in approximately an amount of 65-85 grams KCl per liter resin, thereafter passing water through the bed of cation exchange resin for washing said bed of resin to remove substantially all chloride therefrom, then passing through the cation resin a concentrated aqueous carbonated ammonia solution having a $NH_3/\frac{1}{2}CO_2$ molar ratio within the range of 0.55 and 0.65 in an amount in large excess required for exchange with the resin followed by passing water through the cation exchange resin, recovering as effluent from the resin bed an aqueous solution of carbonated potash and carbonated ammonia and heating said aqueous solution of carbonated potash and carbonated ammonia to vaporize $NH_3$ and $CO_2$.

9. A process for the manufacture of carbonated potash from potassium chloride and carbonated ammonia which comprises passing an aqueous solution of potassium chloride through a bed of sulfonated phenolic cation exchange resin in an amount of 65–85 grams KCl per liter resin, thereafter passing water through the bed of cation exchange resin for washing said bed of resin to remove substantially all chloride therefrom, then passing through the cation resin an aqueous carbonated ammonia solution having a $NH_3/\frac{1}{2}CO_2$ molar ratio in excess of 0.5 in an amount in excess required for exchange with the resin followed by passing water through the cation exchange resin, recovering as effluent from the resin bed an aqueous solution of carbonated potash and carbonated ammonia, heating said aqueous solution of carbonated potash and carbonated ammonia to convert a major portion of the $KHCO_3$ in the solution to $K_2CO_3$ and to vaporize over 98% $NH_3$ initially present in said solution together with free $CO_2$ and a small amount of water vapor, and recycling the thus liberated $NH_3$ and $CO_2$ for further reaction with the resin.

10. A process for the manufacture of carbonated potash from potassium chloride and carbonated ammonia which comprises passing an aqueous solution of potassium chloride through a bed of carboxylic acid cation exchange resin in an amount of less than 100 grams KCl per liter resin, thereafter passing water through the bed of cation exchange resin for washing said bed of resin to remove substantially all chloride therefrom, then passing through the cation resin an aqueous carbonated ammonia solution having a $NH_3/\frac{1}{2}CO_2$ molar ratio in excess of 0.5 in an amount in excess required for exchange with the resin followed by passing water through the cation exchange resin, recovering as effluent from the resin bed an aqueous solution of carbonated potash and carbonated ammonia and heating said aqueous solution of carbonated potash and carbonated ammonia to vaporize $NH_3$ and $CO_2$.

11. A process for the manufacture of carbonated potash from potassium chloride and carbonated ammonia which comprises passing an aqueous solution of potassium chloride through a bed of carboxylic acid cation exchange resin in an amount of 65–85 grams KCl per liter resin, thereafter passing water through the bed of cation exchange resin for washing said bed of resin to remove substantially all chloride therefrom, then passing through the cation resin an aqueous carbonated ammonia solution having a $NH_3/\frac{1}{2}CO_2$ molar ratio in excess of 0.5 in an amount in excess required for exchange with the resin followed by passing water through the cation exchange resin, recovering as effluent from the resin bed an aqueous solution of carbonated potash and carbonated ammonia, heating said aqueous solution of carbonated potash and carbonated ammonia to convert a major portion of the $KHCO_3$ in the solution to $K_2CO_3$ and to vaporize over 98% $NH_3$ initially present in said solution together with free $CO_2$ and a small amount of water vapor, and recycling the thus liberated $NH_3$ and $CO_2$ for further reaction with the resin.

12. A process for the manufacture of carbonated potash from potassium chloride and carbonated ammonia which comprises passing an aqueous solution of potassium chloride through a bed of an organic cation exchange resin selected from the group consisting of a sulfonated phenolic, carboxylic acid and sulfonated polystyrene resins in an amount of 65–85 grams KCl per liter resin, thereafter passing water through the bed of cation exchange resin for washing said bed of resin to remove substantially all chloride therefrom, then passing through the cation resin an aqueous carbonated ammonia solution having a $NH_3/\frac{1}{2}CO_2$ molar ratio within the range of 0.55 and 0.65 in an amount in large excess required for exchange with the resin followed by passing water through the cation exchange resin, recovering as effluent from the resin bed an aqueous solution of carbonated potash and carbonated ammonia, heating said solution of carbonated potash and carbonated ammonia to convert a major portion of the $KHCO_3$ to $K_2CO_3$ and to vaporize over 98% $NH_3$ initially present in the solution together with free $CO_2$ and a small amount of water vapor, passing said $NH_3$ and $CO_2$ gases together with additional $NH_3$ gas in contact with water to absorb the gases therein, passing $CO_2$ in contact with the resultant solution to dissolve the $CO_2$ therein and thereby produce an aqueous solution of carbonated ammonia, and recycling the aqueous solution of carbonated ammonia for further reaction with the resin.

13. A process for the manufacture of carbonated potash from potassium chloride and carbonated ammonia which comprises passing an aqueous solution of potassium chloride through a bed of sulfonated polystyrene cation exchange resin in an amount of 65–85 grams KCl per liter resin, thereafter passing water through the bed of cation exchange resin for washing said bed of resin to remove substantially all chloride therefrom, then passing through the cation resin an aqueous carbonated ammonia solution having a $NH_3/\frac{1}{2}CO_2$ molar ratio within the range of 0.55 and 0.65 in an amount in excess required for exchange with the resin followed by passing water through the cation exchange resin, recovering as effluent from the resin bed an aqueous solution of carbonated potash and carbonated ammonia, heating said aqueous solution of carbonated potash and carbonated ammonia to convert a major portion of the $KHCO_3$ in the solution to $K_2CO_3$ and to vaporize over 98% $NH_3$ initially present in said solution together with free $CO_2$ and a small amount of water vapor, passing said $NH_3$ and $CO_2$ gases together with additional $NH_3$ gas in contact with water to absorb the gases therein, passing $CO_2$ in contact with the resultant solution to dissolve the $CO_2$ therein and thereby produce an aqueous solution of carbonated ammonia, and recycling the carbonated ammonia solution for further reaction with the resin.

14. A process for the manufacture of carbonated potash from potassium chloride and carbonated ammonia which comprises passing an aqueous solution of potassium chloride through a bed of an organic cation exchange resin selected from the group consisting of a sulfonated phenolic, carboxylic acid and sulfonated polystyrene resins in an amount of 65–85 grams KCl per liter resin, thereafter passing water through the bed of cation exchange resin for washing said bed of resin to remove substantially all chloride therefrom, then passing through the cation resin an aqueous carbonated ammonia solution having a $NH_3/\frac{1}{2}CO_2$ molar ratio within the range of 0.55 and 0.65 in an amount in large excess required for exchange with the resin followed by passing water through the cation exchange resin, recovering as effluent from the resin bed an aqueous solution of carbonated potash and carbonated ammonia, subjecting said aqueous solution of carbonated potash and carbonated ammonia to submerged combustion, i. e. burning a fuel under the surface of said aqueous solution, to remove as vapors about 40–60% of said solution leaving 40–60% of said solution as unvaporized solution, i. e. bottoms, said vapors containing over 98% $NH_3$ initially present in said solution, recycling the distillate containing the $NH_3$ from the submerged combustion for further reaction with the resin, and subjecting the 40–60% bottoms to further submerged combustion to precipitate a solid carbonate of potash.

15. A process for the manufacture of carbonated potash from potassium chloride and carbonated ammonia which comprises passing an aqueous solution of potassium chloride through a bed of an organic cation exchange resin selected from the group consisting of a sulfonated phenolic, carboxylic acid and sulfonated polystyrene resins in an amount of 65–85 grams KCl per liter resin, thereafter passing water through the bed of cation exchange resin for washing said bed of resin to remove substantially all chloride therefrom, then passing through the cation resin an aqueous carbonated ammonia solution having a $NH_3/\frac{1}{2}CO_2$ molar ratio within the range of 0.55 and 0.65 in an amount in large excess required for exchange with the resin followed by passing water through the cation exchange resin, recovering as effluent from the resin bed an aqueous solution of carbonated potash and carbonated ammonia, heating said solution of carbonated potash and carbonated ammonia to convert a major portion of the $KHCO_3$ to $K_2CO_3$ and to vaporize over 98% $NH_3$ initially present in said solution together with free $CO_2$ and a small amount of water vapor, and leaving unvaporized solution, i. e. bottoms, containing $K_2CO_3$ and $KHCO_3$, recycling the thus liberated $NH_3$ and $CO_2$ for further reaction with the resin, adding potassium hydroxide to the bottoms in an amount sufficient to react with the minor portion of potassium bicarbonate in the solution to produce a solution containing only potassium carbonate and evaporating said potassium carbonate solution to produce solid potassium carbonate.

16. A process for the manufacture of carbonated potash from potassium chloride and carbonated ammonia which comprises passing an aqueous solution of potassium chloride through a bed of an organic cation exchange resin selected from the group consisting of a sulfonated phenolic, carboxylic acid and sulfonated polystyrene resins in an amount of 65–85 grams KCl per liter resin, thereafter passing water through the bed of cation exchange resin for washing said bed of resin to remove substantially all chloride therefrom, then passing through the cation resin an aqueous carbonated ammonia solution having a $NH_3/\frac{1}{2}CO_2$ molar ratio within the range of 0.55 and 0.65 in an amount in large excess required for exchange with the resin followed by passing water through the cation exchange resin, recovering as effluent from the resin bed an aqueous solution of carbonated potash and carbonated ammonia, heating said solution of carbonated potash and carbonated ammonia to convert a major portion of the $KHCO_3$ to $K_2CO_3$ and to vaporize over 98% $NH_3$ initially present in said solution together with free $CO_2$ and a small amount of water vapor and leaving unvaporized solution, i. e. bottoms, containing $K_2CO_3$ and $KHCO_3$, recycling the thus liberated $NH_3$ and $CO_2$ for further reaction with the resin, adding lime to the bottoms in an amount sufficient to convert the minor portion of potassium bicarbonate in the solution to produce a solution containing only potassium carbonate, separating solid precipitates resulting from said reaction, and then evaporating the potassium carbonate solution to produce solid potassium carbonate.

17. A process for the manufacture of carbonated potash from potassium chloride and carbonated ammonia which comprises passing an aqueous solution of potassium chloride through a bed of sulfonated polystyrene cation exchange resin in an amount of 65–85 grams KCl per liter resin, thereafter passing water through the bed of cation exchange resin for washing said bed of resin to remove substantially all chloride therefrom, then passing through the cation resin an aqueous carbonated ammonia solution having a $NH_3/\frac{1}{2}CO_2$ molar ratio within the range of 0.55 and 0.65 in an amount in large excess required for exchange with the resin followed by passing water through the cation exchange resin, recovering as effluent from the resin bed an aqueous solution of carbonated potash and carbonated ammonia, subjecting said aqueous solution of carbonated potash and carbonated ammonia to submerged combustion, i. e. burning a fuel under the surface of said aqueous solution, to remove as vapors about 40–60% of said solution, leaving 40–60% of said solution as unvaporized solution, i. e. bottoms, said vapors containing over 98% $NH_3$ initially present in said solution, recycling the distillate containing the $NH_3$ from the submerged combustion for further reaction with the resin, and subjecting the 40–60% bottoms to further submerged combustion to precipitate a solid carbonate of potash.

18. A process for the manufacture of carbonated potash from potassium chloride and carbonated ammonia which comprises passing an aqueous solution of potassium chloride through a bed of sulfonated polystyrene cation exchange resin in an amount of 65–85 grams KCl per liter resin, thereafter passing water through the bed of cation exchange resin for washing said bed of resin to remove substantially all chloride therefrom, then passing through the cation resin an aqueous carbonated ammonia solution having a $NH_3/\frac{1}{2}CO_2$ molar ratio within the range of 0.55 and 0.65 in an amount in large excess required for exchange with the resin, followed by passing water through the cation exchange resin, recovering as effluent from the resin bed an aqueous solution of carbonated potash and carbonated ammonia, heating said solution of carbonated potash and carbonated ammonia to convert a major portion of the $KHCO_3$ to $K_2CO_3$ and to vaporize over 98% $NH_3$ initially present in said solution together with free $CO_2$ and a small amount of water vapor and leaving unvaporized solution, i.e. bottoms, containing $K_2CO_3$ and $KHCO_3$, recycling the thus liberated $NH_3$ and $CO_2$ for further reaction with the resin, adding potassium hydroxide to the bottoms in an amount sufficient to react with the minor portion of potassium bicarbonate in the solution to produce a solution containing only potassium carbonate and evaporating said potassium carbonate solution to produce solid potassium carbonate.

19. A process for the manufacture of carbonated potash from potassium chloride and carbonated ammonia which comprises passing an aqueous solution of potassium chloride through a bed of sulfonated polystyrene cation exchange resin in an amount of 65–85 grams KCl per liter resin, thereafter passing water through the bed of cation exchange resin for washing said bed of resin to remove substantially all chloride therefrom, then passing through the cation resin an aqueous carbonated ammonia solution having a $NH_3/\frac{1}{2}CO_2$ molar ratio within the range of 0.55 and 0.65 in an amount in large excess required for exchange with the resin, followed by passing water through the cation exchange resin, recovering as effluent from the resin bed an aqueous solution of carbonated potash and carbonated ammonia, heating said solution of carbonate potash and carbonated ammonia to convert a major portion of the $KHCO_3$ to $K_2CO_3$ and to vaporize over 98% $NH_3$ initially present in said solution together with free $CO_2$ and a small amount of water vapor and leaving unvaporized solution, i. e. bottoms, containing $K_2CO_3$ an $KHCO_3$, recycling the thus liberated $NH_3$ and $CO_2$ for further reaction with the resin, adding lime to the bottoms in an amount sufficient to convert the minor portion of potassium bicarbonate in the solution to potassium carbonate, separating solid precipitates resulting from said reaction, and then evaporating the potassium carbonate solution to precipitate solid potassium carbonate.

References Cited in the file of this patent

UNITED STATES PATENTS

| | | |
|---|---|---|
| 1,477,086 | Suchy | Dec. 11, 1923 |
| 1,978,447 | Austerweil | Oct. 30, 1934 |
| 2,413,791 | Shafor | Jan. 7, 1947 |
| 2,619,404 | Skogseid | Nov. 25, 1952 |
| 2,656,245 | Gray | Oct. 20, 1953 |